H. J. MENTINK.
ATTACHMENT FOR HARVESTERS.
APPLICATION FILED JAN. 5, 1917.
1,257,092.
Patented Feb. 19, 1918.
3 SHEETS—SHEET 1.
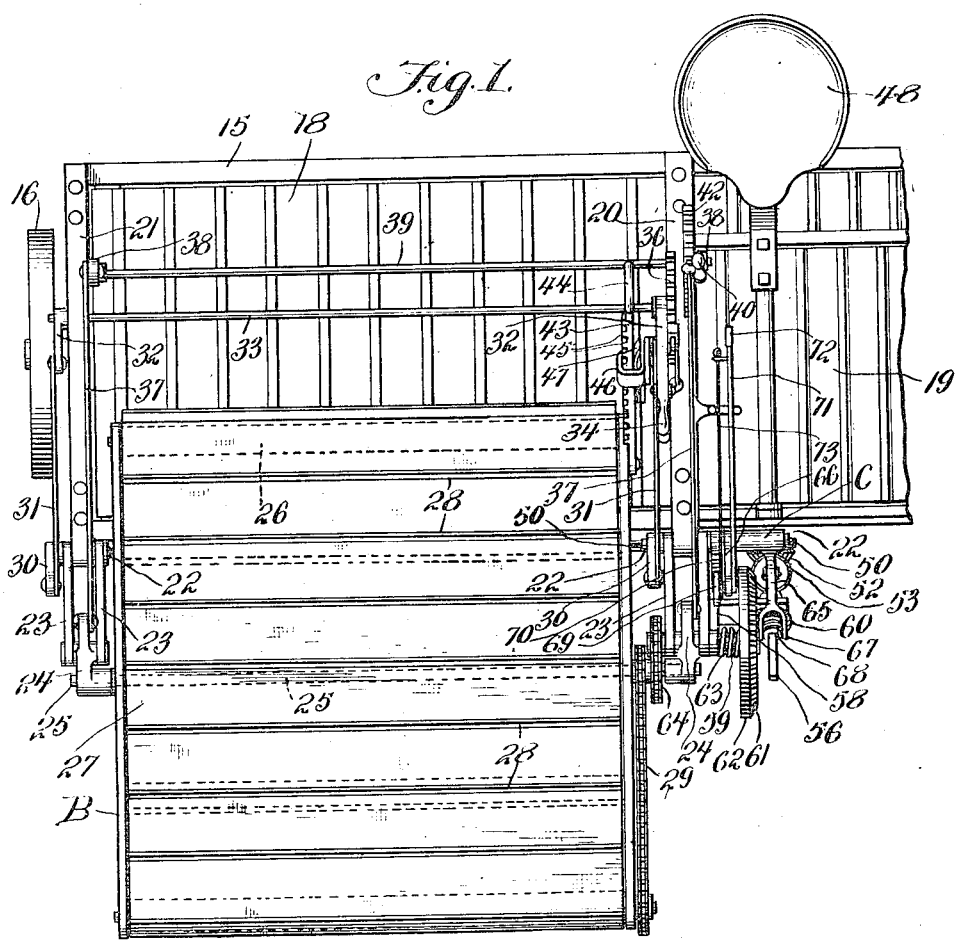
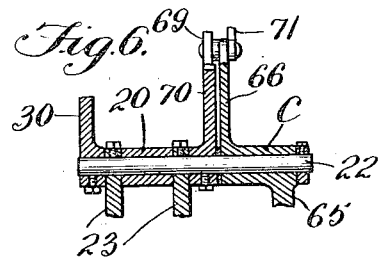
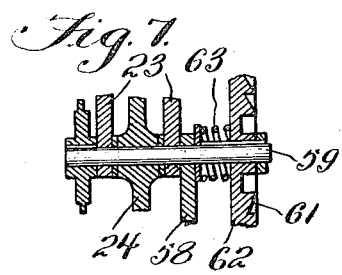
WITNESSES
INVENTOR
Henry Mentink
BY Victor J. Evans
ATTORNEY H. J. MENTINK.
ATTACHMENT FOR HARVESTERS.
APPLICATION FILED JAN. 5, 1917.
1,257,092.
Patented Feb. 19, 1918.
3 SHEETS—SHEET 2.
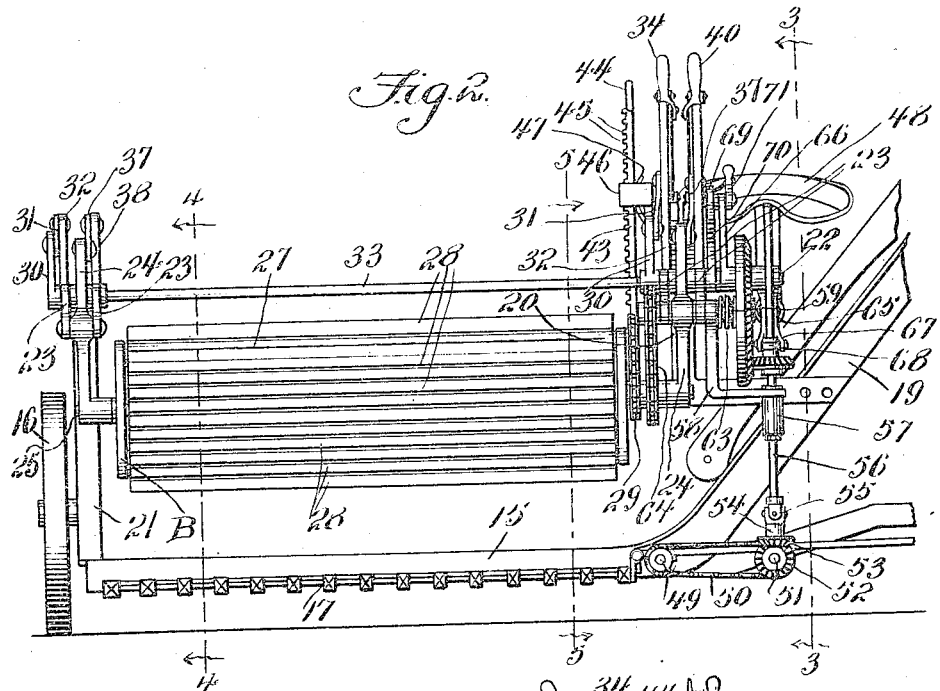
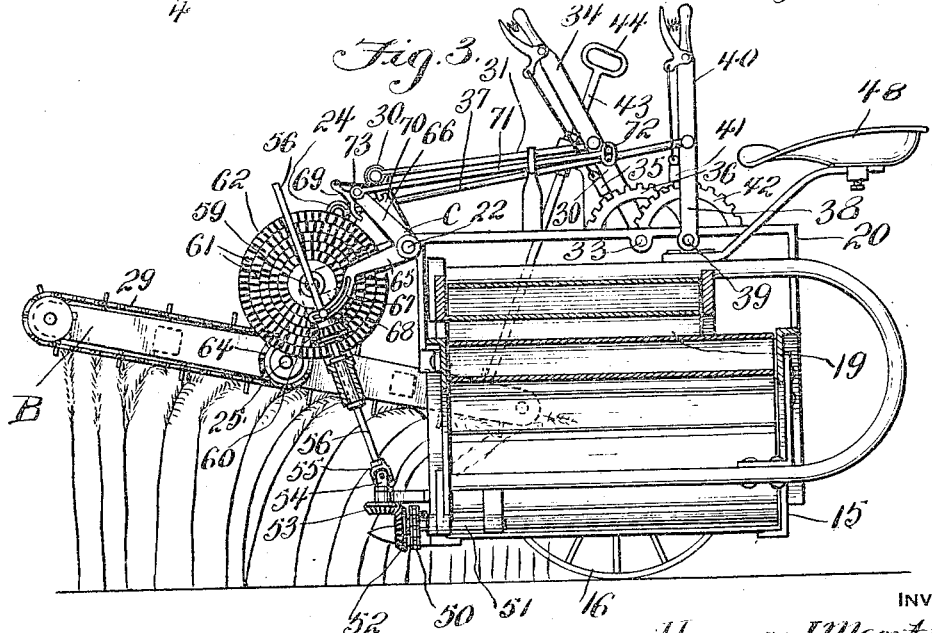

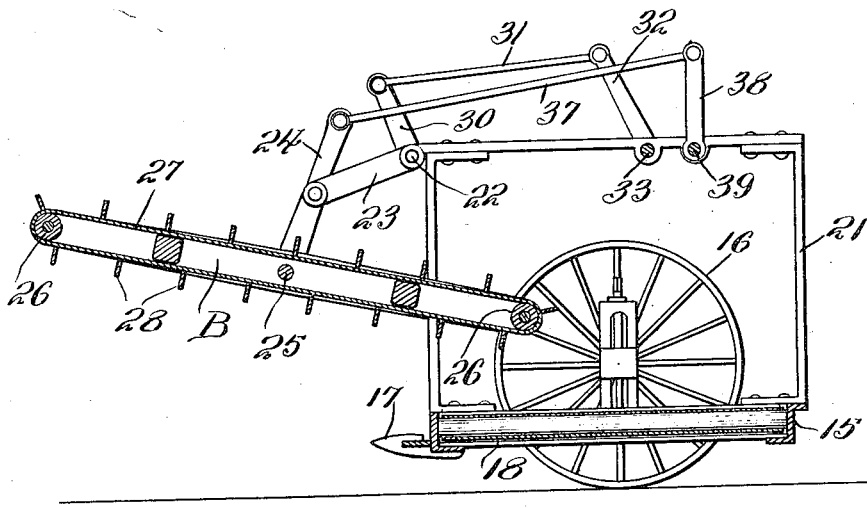
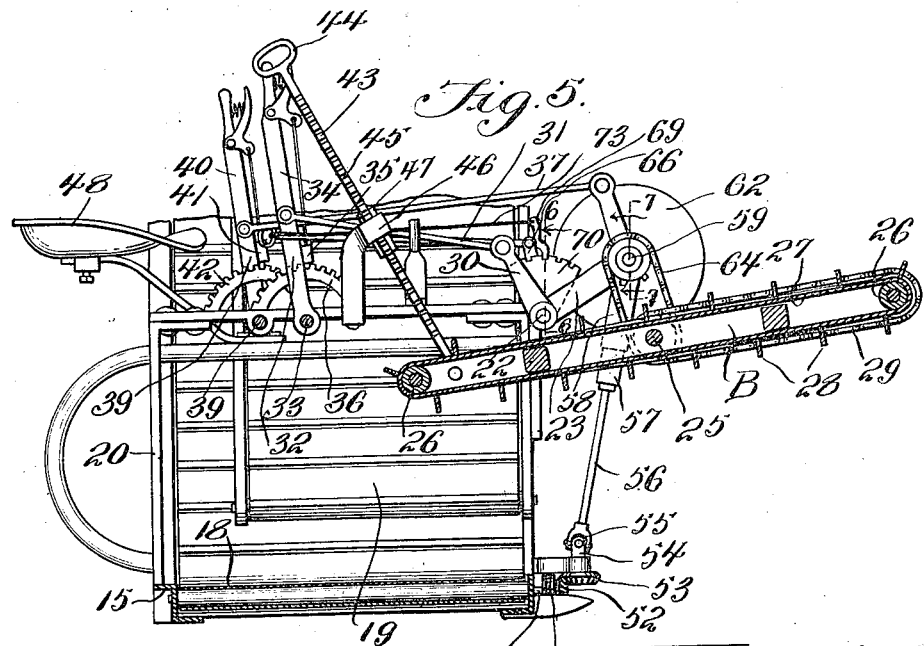

UNITED STATES PATENT OFFICE.

HENRY J. MENTINK, OF GRESHAM, NEBRASKA.

ATTACHMENT FOR HARVESTERS.

1,257,092.  Specification of Letters Patent.  Patented Feb. 19, 1918.

Application filed January 5, 1917. Serial No. 140,854.

*To all whom it may concern:*

Be it known that I, HENRY J. MENTINK, a citizen of the United States, residing at Gresham, in the county of York and State of Nebraska, have invented new and useful Improvements in Attachments for Harvesters, of which the following is a specification.

This invention relates to attachments for harvesters, and its principal object is to produce a simple and efficient device to take the place of the ordinary reel for the purpose of bending or deflecting the incoming grain in the direction of the cutting apparatus.

A further object of the invention is to produce a device of the class described which will operate effectively on the grain without the beating action of the reel.

A further object of the invention is to produce a device of the class described including an endless conveyer adapted to engage the grain, said conveyer being carried by a frame which is mounted for adjustment in various directions to enable it to operate successfully in connection with grain of various kinds and under varying conditions.

A further object of the invention is to produce a device of the class described which may be variously speeded, and the speed of which may be changed by the operator while the device is in operation.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,

Figure 1 is a top plan view showing a portion of a harvester to which the invention has been applied.

Fig. 2 is a front elevation of the same.

Fig. 3 is a sectional view taken on the line 3—3 in Fig. 2.

Fig. 4 is a sectional view taken on the line 4—4 in Fig. 2.

Fig. 5 is a sectional view taken on the line 5—5 in Fig. 2.

Fig. 6 is a sectional view taken on the line 6—6 in Fig. 5.

Fig. 7 is a sectional view taken on the line 7—7 in Fig. 5.

Corresponding parts in the several figures are denoted by like characters of reference.

15 designates a conventional harvester platform, the outer end of which is supported by the grain wheel 16, said platform being equipped with the cutting apparatus 17 and with an endless carrier 18, whereby the cut grain is carried in the direction of the elevator, a portion of which appears at 19.

Mounted on the platform, adjacent to the inner and outer ends thereof, respectively, are supporting frames 20 and 21 at the front corners of which shafts 22 are supported, each of said shafts carrying a pair of arms 23 between which a lever 24 is swingingly supported. The downwardly extending arms of the levers 24 support a shaft 25 which extends transversely through a frame B, said frame being pivotally supported on said shaft. The frame B is provided at the front and rear ends thereof with rollers 26 over which is guided an endless conveyer 27, said conveyer being equipped at suitable intervals with slats 28. A transmission chain 29 is suitably arranged to transmit motion between the shaft 25 and one of the rollers 26 for the purpose of driving the endless conveyer.

The shafts 22 are each provided with a radial arm or crank 30, said cranks being connected by rods 31 with similar cranks 32 that extend from a rock shaft 33 mounted on the frames 20, 21. One of the cranks 32 is extended upwardly to form a hand lever 34 having a stop member 35 engaging a rack segment 36 for the purpose of retaining the hand lever and the parts controlled thereby at various adjustments. The upwardly extending arms of the levers 24 are connected by rods 37 with arms or cranks 38 extending upwardly from a rock shaft 39 supported on the frames 20, 21. One of the arms 38 is extended upwardly to form a hand lever 40 having a stop member 41 engaging a rack segment 42 for the purpose of retaining the hand lever 40 and the parts controlled thereby at various adjustments. It will be seen that by manipulating the hand lever 34 the bell cranks composed of the arms 23, 30 may be rocked, thereby raising or lowering the levers 24 carrying the shaft 25 and the frame B. By manipulating the hand lever 40, the levers 24 may be rocked, thereby effecting adjustment of the frame B longitudinally with respect to the harvester platform and the machine of which it forms a part. The frame B may also be rocked about the axis of the shaft 25 by means of an adjusting bar 43 which is pivotally connected with one of the side members of said frame B near the rearward end thereof, as best seen in Fig. 5, said adjusting bar being provided with a handle 44 and with teeth 45 adapted for engagement with a keeper 46 through which said bar is guided, a spring 47 being provided whereby the toothed side of the bar is held in engagement with the keeper. The adjusting bar 43, as well as the levers 34 and 40, are within convenient reach of the driver or operator for whom a seat 48 is provided.

For the purpose of driving the conveyer 27 in any position to which the conveyer frame B may be adjusted and for the purpose of varying the speed, as may be desired, without interrupting the motion of the conveyer or of other parts of the machine, means are provided which I will now proceed to describe.

The elevator 19 of the harvester has a driven shaft 49 from which motion is transmitted by a chain 50 to a shaft 51 carrying a bevel gear 52 with which meshes a bevel gear 53 on a short vertical shaft 54, said shaft 54 being connected by a universal joint 55 with a non-circular shaft 56 for which a suitable bearing 57 is provided, said bearing being supported by a bracket 58 which is pivoted on a shaft 59, said shaft being in alinement with the pivot or fulcrum whereby the lever 24 is connected with the arms 23 of the rock shaft 22 mounted on the frame 20 at the inner end of the platform. The shaft 56 carries a pinion 60 which is slidable thereon but revoluble therewith, said pinion being adapted to mesh with any one of a plurality of circumferential series of teeth 61 on a disk 62 which is fixed on the shaft 59. The shaft 59 may thus be rotated at various speeds, according to the position of the pinion 60, with respect to the disk 62. The disk 62 is pressed by a spring 63 in the direction of the pinion 60 to avoid the liability of cogs slipping when the device is in operation. From the shaft 59 motion is transmitted by a chain 64 to the shaft 25 which in turn transmits motion to the conveyer 27, as previously described.

The shaft 22 supported at the front corner of the frame 20 adjacent to the inner end of the platform supports a bell crank C having a forwardly extending arm 65 and an upwardly extending arm 66. The arm 65 has an arcuate slotted extension 67 which is slidably connected with a sleeve 68 mounted on the head of the pinion 60. It will be seen that by rocking the bell crank on the shaft 22, the pinion may be moved radially with respect to the disk 62, placing the pinion in engagement with any desired circumferential series of teeth 61, thereby varying the speed imparted to the disk 62 and the parts driven thereby. The arm 66 of the bell crank C carries a dog 69 for locking engagement with a segment 70 which is fixed in the shaft 22. The bell crank C, when the dog 69 is disengaged from the segment 70, may be rocked by means of a suitably guided operating rod 71 having a handle 72, a flexible connection 73 being also provided whereby the dog may be manipulated to release it from the segment, said dog being preferably spring actuated to hold it normally in engagement with the segment.

It will be readily seen that by means of the bell crank C adjustment of the pinion 60 may be effected at any time while the machine is in operation, thereby varying the speed of the conveyer 27. By proper manipulation of the hand lever 34 the shafts 22 may be rocked to effect vertical adjustment of the conveyer frame B, and when such adjustment is effected, the bell crank, being locked relatively to the shaft 22, will be rocked together with said shaft, and the position of the pinion 60 relatively to the disk 62 will thus be preserved.

In the operation of this invention it will be seen that the frame B carrying the conveyer 27 may be tilted in such a manner and may also be adjusted vertically and longitudinally so that the grain will be engaged by the conveyer at any angle, at any elevation and at any point longitudinally with respect to the harvester platform which will be found most efficient to bend or deflect the straw in the direction of the cutting apparatus. This operation will be performed without the objectionable beating action of the conventional reel, and it is found that much grain which would be loosened and detached by the use of an ordinary reel will be saved by the use of the improved attachment.

While the conveyer 27 has been described as an endless conveyer provided with slats, I would have it understood that the construction of said conveyer may be varied to any extent within the scope of the claims. The means employed for adjusting and supporting the conveyer frame may also be changed without materially departing from the invention.

Having thus described the invention, what is claimed as new, is:—

1. A harvester platform, a conveyer frame, a conveyer in said frame, a shaft on which the conveyer frame is pivotally supported, means for adjusting the frame for securing it at various pivotal adjustments, a pair of levers supporting the shaft on which the conveyer frame is supported, bell cranks supporting said levers, means for rocking the levers and for securing them at various adjustments, means for rocking the bell cranks and for securing them at various adjustments, means for driving the conveyer and for varying the speed thereof while the device is in operation, said means including a disk having a plurality of circumferential series of teeth, a non-circular driven shaft, a pinion slidable on the non-circular shaft and meshing with the toothed disk, and a bell crank having an arm in slidable engagement with the pinion to effect adjustment thereof relatively to the toothed disk.

2. A harvester platform, a conveyer frame, a conveyer in said frame, a shaft on which the conveyer frame is pivotally supported, means for adjusting the frame for securing it at various pivotal adjustments, a pair of levers supporting the shaft on which the conveyer frame is supported, bell cranks supporting said levers, means for rocking the levers and for securing them at various adjustments, means for rocking the bell cranks and for securing them at various adjustments, means for driving the conveyer and for varying the speed thereof while the device is in operation, said means including a disk having a plurality of circumferential series of teeth, a non-circular driven shaft, a pinion slidable on the non-circular shaft and meshing with the toothed disk, a bell crank having an arm in slidable engagement with the pinion to effect adjustment thereof relatively to the toothed disk, and means for locking the bell crank against movement.

In testimony whereof I affix my signature.

HENRY J. MENTINK.

Copies of this patent may be obtained for five cents each, by addressing the "Commissioner of Patents, Washington, D. C."